(12) United States Patent
Tsubaki et al.

(10) Patent No.: US 8,450,393 B2
(45) Date of Patent: May 28, 2013

(54) POLYMERIC COMPOUND CONTAINING COMPOSITION, AND IMAGE FORMING PROCESS AND APPARATUS

(75) Inventors: Keiichiro Tsubaki, Tokyo (JP); Ryuji Higashi, Kawasaki (JP); Masayuki Ikegami, Atsugi (JP); Keiko Yamagishi, Ebina (JP); Ryo Natori, Yokohama (JP); Takaho Shibata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1374 days.

(21) Appl. No.: 11/721,625

(22) PCT Filed: Apr. 4, 2006

(86) PCT No.: PCT/JP2006/307520
§ 371 (c)(1),
(2), (4) Date: Jun. 13, 2007

(87) PCT Pub. No.: WO2006/107112
PCT Pub. Date: Oct. 12, 2006

(65) Prior Publication Data
US 2009/0311425 A1    Dec. 17, 2009

(30) Foreign Application Priority Data

Apr. 5, 2005 (JP) ................................. 2005-109172
Apr. 3, 2006 (JP) ................................. 2006-102283

(51) Int. Cl.
*C09D 11/00* (2006.01)
(52) U.S. Cl.
USPC ........... 523/160; 523/161; 427/526; 524/547; 347/100

(58) Field of Classification Search ............... 523/160, 523/161
See application file for complete search history.

(56) References Cited

U.S. PATENT DOCUMENTS

| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |

(Continued)

FOREIGN PATENT DOCUMENTS

| EP | 1 243 624 A1 | 9/2002 |
| EP | 1 484 363 A1 | 12/2004 |

(Continued)

OTHER PUBLICATIONS

Aoshima, et al., "Living Cationic Polymerization of Vinyl Monomers," Polymer Bulletin, vol. 15, No. 5, May 30, 1986, pp. 417-423.

*Primary Examiner* — Doris Lee
(74) *Attorney, Agent, or Firm* — Fitzpatrick, Cella, Harper & Scinto

(57) ABSTRACT

The invention provides an ink composition, which is improved in dispersibility and fastness properties and is excellent in dispersion stability and re-solubility owing to dispersed particles in which a coloring material is included by a crosslinked hydrophobic block segment in a dispersing polymer. The ink composition contains an amphiphilic block polymer compound, in which a coloring material is included, and a medium, wherein the amphiphilic block polymer compound, in which the coloring material is included, forms a dispersed particle having the hydrophobic block segment as an internal core part, and the hydrophobic block segment is crosslinked.

19 Claims, 3 Drawing Sheets

U.S. PATENT DOCUMENTS

| | | | |
|---|---|---|---|
| 4,723,129 A | 2/1988 | Endo et al. | |
| 4,740,796 A | 4/1988 | Endo et al. | |
| 5,085,698 A | 2/1992 | Ma et al. | |
| 6,262,152 B1 * | 7/2001 | Fryd et al. | 524/90 |
| 7,004,579 B2 | 2/2006 | Sato et al. | 347/105 |
| 7,037,996 B2 | 5/2006 | Ikegami et al. | |
| 7,056,972 B2 | 6/2006 | Nakazawa et al. | 524/505 |
| 7,067,590 B2 | 6/2006 | Sato et al. | 525/299 |
| 7,151,156 B2 | 12/2006 | Sato et al. | 528/86 |
| 2002/0186288 A1 * | 12/2002 | Nakazawa et al. | 347/100 |
| 2004/0102601 A1 * | 5/2004 | Saito et al. | 528/271 |
| 2005/0033010 A1 * | 2/2005 | Sato et al. | 528/80 |
| 2005/0037160 A1 | 2/2005 | Suda et al. | |
| 2005/0131102 A1 | 6/2005 | Nakazawa et al. | 523/160 |
| 2005/0140762 A1 | 6/2005 | Sato et al. | 347/100 |
| 2005/0197424 A1 | 9/2005 | Higashi et al. | 523/160 |
| 2005/0209367 A1 | 9/2005 | Sato et al. | 523/161 |
| 2005/0219277 A1 | 10/2005 | Sato et al. | 347/1 |
| 2005/0239918 A1 | 10/2005 | Nakazawa et al. | 523/160 |
| 2005/0249925 A1 | 11/2005 | Ikegami et al. | 428/195.1 |
| 2005/0272834 A1 | 12/2005 | Ikegami et al. | |
| 2006/0004124 A1 | 1/2006 | Tsubaki et al. | 523/160 |
| 2006/0012051 A1 | 1/2006 | Sato et al. | |
| 2006/0046515 A1 | 3/2006 | Maruyama et al. | |
| 2006/0047015 A1 | 3/2006 | Duda et al. | 523/160 |
| 2006/0100310 A1 | 5/2006 | Nakazawa et al. | 523/160 |
| 2006/0128828 A1 | 6/2006 | Sato et al. | 523/160 |
| 2006/0144287 A1 | 7/2006 | Tsubaki et al. | 106/31.13 |
| 2006/0146087 A1 | 7/2006 | Sato et al. | 347/21 |
| 2006/0148997 A1 | 7/2006 | Sato et al. | 525/299 |
| 2006/0160975 A1 | 7/2006 | Suda et al. | 526/330 |
| 2006/0178468 A1 | 8/2006 | Sato et al. | 524/556 |
| 2006/0221117 A1 | 10/2006 | Sato et al. | 347/21 |
| 2006/0235177 A1 | 10/2006 | Ikegami et al. | 526/287 |
| 2006/0244800 A1 | 11/2006 | Nakazawa et al. | |
| 2006/0281853 A1 | 12/2006 | Yamagishi et al. | 524/547 |
| 2007/0015856 A1 | 1/2007 | Sato et al. | 524/80 |
| 2007/0063371 A1 | 3/2007 | Sato et al. | |
| 2007/0069183 A1 | 3/2007 | Sato et al. | 252/500 |
| 2007/0119336 A1 | 5/2007 | Nakahama et al. | 106/31.6 |
| 2007/0215270 A1 | 9/2007 | Nakahama et al. | 156/238 |

FOREIGN PATENT DOCUMENTS

| | | | |
|---|---|---|---|
| JP | 59-123670 | | 7/1984 |
| JP | 59-138461 | | 8/1984 |
| JP | 11-80221 | | 3/1999 |
| JP | 11-322866 | | 11/1999 |
| JP | 11-322942 | | 11/1999 |
| JP | 2003-89752 | | 3/2003 |
| JP | 2003-261738 | | 9/2003 |
| JP | 2004-18640 | | 1/2004 |
| JP | 2004-27156 | | 1/2004 |
| JP | 2004-217705 | | 8/2004 |
| JP | 2005-36185 | | 2/2005 |
| JP | 2005-139251 | | 6/2005 |
| JP | 2005-213298 | | 8/2005 |
| JP | 2005-298676 | | 10/2005 |
| JP | 2005-344100 | | 12/2005 |
| WO | WO 03/074609 | * | 9/2003 |
| WO | WO 2004/063240 | | 7/2004 |
| WO | WO 2004/113408 | | 12/2004 |
| WO | WO 2005/044883 | | 5/2005 |
| WO | WO 2005/070655 | | 8/2005 |

* cited by examiner

POLYMERIC COMPOUND CONTAINING COMPOSITION, AND IMAGE FORMING PROCESS AND APPARATUS

TECHNICAL FIELD

The present invention relates to compositions containing a block polymer compound, which are useful as, for example, various kinds of ink-jet inks, as well as an image forming process and apparatus.

BACKGROUND ART

In recent years, digital printing technology has been very vigorously developed. Typical examples of this digital printing technology include those called electrophotographic technology and ink jet technology, and its presence as image forming technology in offices, homes and the like has more and more increased in recent years.

Among these, the ink jet technology has great feature of compactness and low power consumption as a directly recording method. Development of high-quality images is also rapidly advanced by development of micro-nozzles or the like. An example of the ink jet technology includes a method in which an ink fed from an ink tank is evaporated and bubbled by heating it by a heater in a nozzle, thereby ejecting the ink to form an image on a recording medium. Another example includes a method in which an ink is ejected from a nozzle by vibrating a piezoelectric element.

Since aqueous dye solutions are generally used as inks used in these methods, in some cases, bleeding may have occurred when inks of different colors overlap each other, or a phenomenon called feathering may have appeared in a direction of fibers in paper at a recorded portion on a recording medium. In order to improve them, it has been investigated to use pigment-dispersed inks (see U.S. Pat. No. 5,085,698); consequently, ink jet inks that actually use pigment inks are now commonly used.

Many pigments are used as colorants for ink jet recording inks, inks for writing utensils, and the like because of their excellent fastness properties such as water fastness and light fastness. Since the pigment is insoluble in water, it is important to stably disperse it in the form of fine particles in water when it is used for an ink composition. An ink composition using a pigment as a colorant, as described above, is generally prepared by subjecting a mixture composed of the pigment, a liquid medium and a dispersant to a dispersing treatment by means of a dispersing machine or the like to prepare a pigment dispersion liquid and adding various kinds of additives to the pigment dispersion liquid as needed from the viewpoints of easy wetting of the pigment with water and prevention of pigment precipitation. As described above, the pigment is often used in the state of the pigment dispersion liquid upon preparation of ink compositions, and thus various techniques as to pigment dispersion liquid have been developed because they affects the properties of the ink composition to be prepared, in particular.

When an organic pigment or carbon black is used in a pigment ink, however, high definition and high color rendering property cannot be achieved as an ink unless the pigment is very finely and stably dispersed, and the resulting ink may be liable to cause clogging at orifices in some cases unless the dispersion stability of the pigment is excellent. Therefore, for the thermal system among ink jet recording systems, which can provide high-quality images at a high speed but imposes heat on part of the ink, an ink excellent in dispersion stability and re-solubility is preferable.

In addition, ink compositions prepared from pigment dispersion liquids used heretofore cannot realize the glossiness and resistance to bronzing of color images formed with such ink compositions as well as the storage stability of the ink compositions at the same time. More specifically, the ink compositions prepared from the pigment dispersion liquids used heretofore have not been sufficient in glossiness of color images formed, have caused a phenomenon referred to as the so-called bronzing that a recorded surface looks bronze according to viewing angle depending on the particle size distribution of pigment particles ejected, resulting in a failure to realize high image quality, and moreover have not been sufficient in storage stability.

As described in Japanese Patent Application Laid-Open No. 2004-027156, a method, in which the periphery of a pigment is crosslinked with a crosslinkable resin to physically enhance the dispersion stability of the pigment, has been used in recent years.

DISCLOSURE OF THE INVENTION

Problem(s) to be Solved by the Invention

This crosslinking with the dispersing resin has been conducted for the purpose of fixing the dispersing resin to the pigment and improving fastness properties and glossiness on media. However, this has caused that such phenomena as increase in viscosity and ejection failure due to clogging. FIG. 6 is a model view illustrating a crosslinked structure seeming to be formed in Japanese Patent Application Laid-Open No. 2004-027156. FIG. 6 illustrates a state that dispersed particles composed of a pigment 1 included in a dispersing resin 2 have been bonded to each other by crosslinkage parts 3. In FIG. 6, 2 dispersed particles crosslinked and bonded to each other are illustrated. However, it is considered that when the crosslinkage between the dispersed particles amounts to a great number, coarse particles are formed to cause the above-described phenomena.

Therefore, in order to utilize these rebelling performance properties, it has heretofore been employed such a method as to use such a pigment at the balance of compromising both performance properties with each other or as to conduct its purification by filtration. Thus, no sufficient effect by the crosslinking has been achieved, or deviation of performance has been seen.

Means for Solving the Problems

The present invention has been completed in view of the foregoing circumstances, and has as its object the provision of a composition that can provide images excellent in glossiness and fastness properties and is excellent in dispersion stability.

In view of such circumstances, the present inventors have thus considered utilizing the crosslinking with a dispersing resin by an entirely new approach. More specifically, an amphiphilic block polymer dispersed particle has been used as a dispersing resin, thereby finding such a system that a steric hindrance is formed around a coloring material, which is a hydrophobic substance, and crosslinking is conducted in only the inside part of this steric hindrance.

Namely, the present invention provides a composition comprising a block polymer compound having a hydrophobic block segment and a hydrophilic block segment, a hydrophobic substance included in the block polymer compound, and an aqueous medium, wherein the block polymer compound forms a micelle by adsorption of the hydrophobic block segment on the hydrophobic substance in the aqueous medium, and only the hydrophobic block segment within the micelle is crosslinked.

According to the present invention, the composition is an ink composition.

According to the present invention, the ink composition is an ink jet composition.

The present invention also provides an image forming process comprising the step of applying the above-described ink composition to a medium, thereby recording an image.

The present invention further provides an image forming apparatus comprising a means for applying the above-described ink composition to a medium to record an image.

The present inventors call this crosslinking form intramicellar crosslinking and distinguish it from conventional crosslinking forms.

By employing the intramicellar crosslinking structure like the present invention, intermicellar crosslinking can be substantially almost ignored, and thus the crosslinked form can be attained with almost the same molecular weight and viscosity as in conventional micellar structures free of crosslinking.

In addition, since it is in the crosslinking form, a form capable of being used without remarkably enhancing the adsorption performance of a hydrophobic part, which has been required of conventional amphiphilic block polymers, can be expected. In this case, the hydrophobic/hydrophilic balance of the polymer can also be changed from the conventional one, so that other performances than adsorption can also be more improved than before.

Effects of the Invention

According to the present invention as described above, it is possible to provide a composition that has excellent glossiness and fastness properties as well as excellent dispersion stability.

According to the present invention, it is also possible to provide an image forming process and apparatus using the ink compositions described above.

BEST MODE FOR CARRYING OUT THE INVENTION

The present invention will hereinafter be described in detail.

The present invention will hereinafter be described in detail with reference to the drawings.

Figure 1:
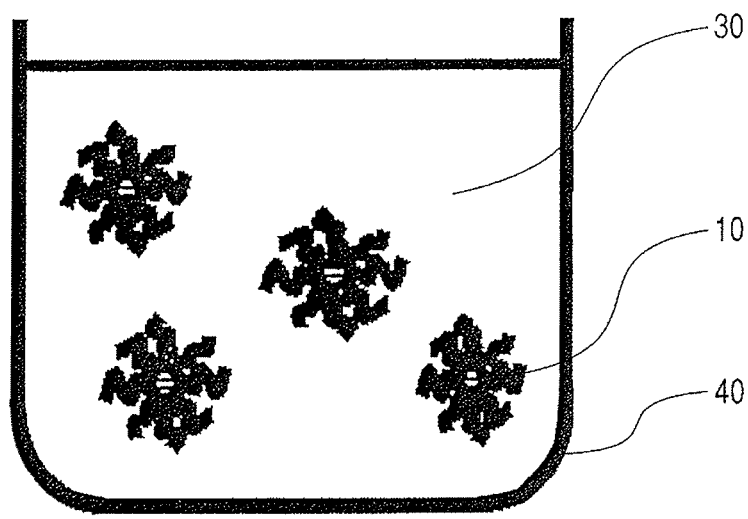
FIG. 1 is a typical view illustrating a composition according to the present invention.
Figure 2:
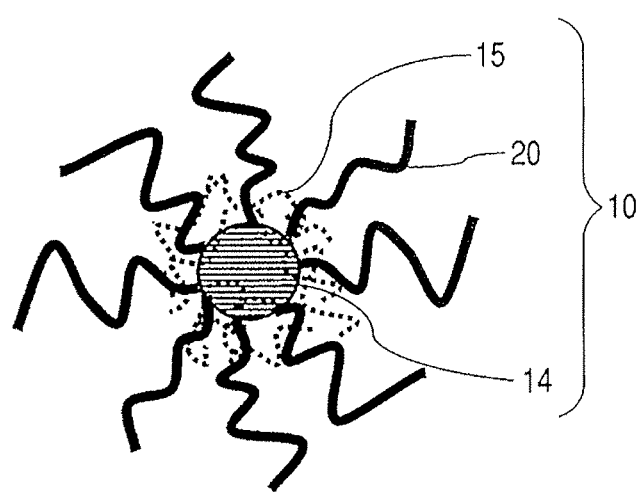
FIG. 2 is a typical view illustrating an example of a micellar structure in FIG. 1.

FIG. 1 is a typical view illustrating a composition according to the present invention, and FIG. 2 is a typical view illustrating an example of a micellar structure in FIG. 1.

In FIG. 1, reference numeral 40 designates a container, and FIG. 1 shows a state that an aqueous medium 30 is contained in this container 40 and dispersed particles 10 are dispersed in the aqueous medium 30. Each dispersed particle 10 is composed of a hydrophobic substance 14 and a dispersing resin 20. The dispersing resin 20 is arranged around the hydrophobic substance 14 so as to include the hydrophobic substance 14 therein, whereby the hydrophobic substance 14 holds its dispersed state in the aqueous medium 30.

Figure 3:
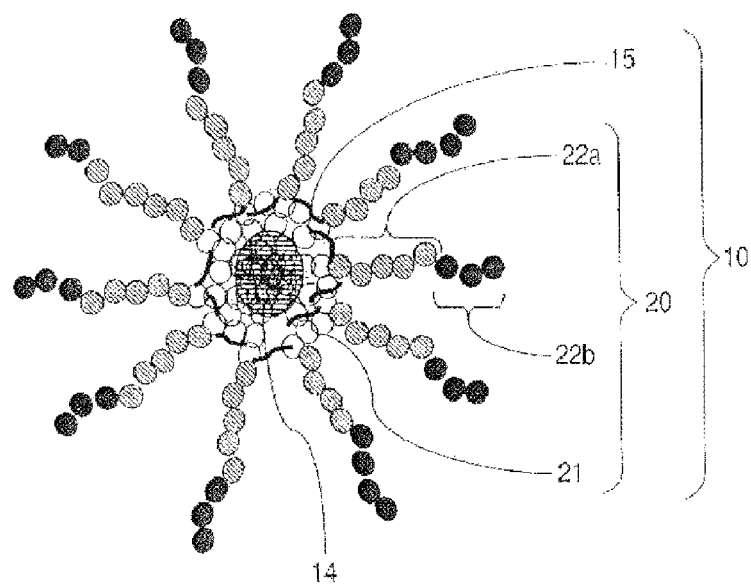
FIG. 3 is a typical view illustrating an example of a micellar structure using an amphiphilic triblock polymer as a dispersing resin.

In order to more particularly explain this dispersing resin 10, description is given with reference to FIG. 3. FIG. 3 illustrates an example where an amphiphilic triblock polymer is used as the dispersing resin. In FIG. 3, reference numeral 14 designates a pigment that is the hydrophobic substance, and reference numeral 20 is an amphiphilic block polymer compound to be the dispersing resin. This amphiphilic block polymer compound 20 has a hydrophobic block segment 21 and a hydrophilic block segment 22. The hydrophilic block segment is composed of a nonionic block segment 22$a$ and an ionic block segment 22$b$. This amphiphilic block polymer 20 is oriented in the aqueous medium in such a manner that the hydrophobic block segment 21 is located inside, thereby forming a micellar state. In a core part of this micelle, the pigment 14 is included so as to be included in the amphiphilic block polymer 20, and the hydrophobic block segment 21 is adsorbed on the pigment 14. A crosslinkable substituent (not illustrated) is additionally provided in the hydrophobic block segment 21, and so the micelle has a crosslinkage part 15 where this crosslinkable substituent is bonded to a crosslinkable substituent of another hydrophobic block segment.

The present invention is so constituted that this crosslinkage part 15 is substantially developed at only the hydrophobic block segment 21. An intramicellar crosslinked structure is formed by this constitution. The crosslinkable substituent is provided in only the hydrophobic block segment 21 of the amphiphilic block polymer 20, thereby permitting crosslinking between polymer molecules within one micelle and inhibiting crosslinking between micelles because the hydrophilic block segment 22 becomes a steric hindrance in the aqueous medium.

Accordingly, in the constitution of the present invention, increase in viscosity and deviation of crosslinked state caused by bonding between micelles, which have heretofore been demerits, can be prevented, and moreover strong fixing of the dispersing resin to the pigment, which is a merit brought about by crosslinkage, is achieved. The dispersed state of the composition can be thereby held well even when the composition is subjected to intense impact or is exposed to a high-heat atmosphere like thermal ink jet. In addition, various properties of ejection performance can also be excellent.

Further, since the dispersing resin is prevented from being detached from media by virtue of this crosslinkage, it is considered that an occasion where the pigment is exposed to the surfaces of media can be greatly reduced compared with the prior art, and it also contributes to the improvement of glossiness and fastness properties.

In the above-described embodiment, the description has been given taking, as an example of the hydrophobic substance included in the dispersing resin, the pigment that is a coloring material. However, the present invention is not limited thereto. Any hydrophobic substance may be included so far as the effect can be achieved by firm inclusion of the hydrophobic substance in a severe environment or as the properties of dispersed particles can be improved by intramicellar crosslinking.

A polymer compound contained in an ink composition according to the present invention is an amphiphilic block polymer compound. The amphiphilicity means having both natures of solvent compatibility and solvent repellency, and the amphiphilic block polymer compound is a polymer compound having at least one solvent compatible block segment and at least one solvent repellent block segment. The solvent compatibility means such a nature that affinity for a principal solvent used in a polymer-containing composition, which will be described subsequently, is high, while the solvent repellency means such a nature that affinity for the solvent is low. Since the solvent of the ink composition according to the present invention is an aqueous medium, the block polymer compound according to the present invention comes to have at least one hydrophilic block segment and at least one hydrophobic block segment therein.

The feature of the block polymer compound according to the present invention resides in that it has a crosslinkable substituent comprising a polymerizable unsaturated group, and the crosslinkable substituent is provided in only the hydrophobic block segment.

The micelle according to the present invention means a core-shell type micelle obtained by dispersing an amphiphilic block polymer having both hydrophilic block segment and hydrophobic block segment in an aqueous medium.

At this time, the micellar structure according to the present invention shows such a structure that the hydrophobic block segment and the hydrophilic block segment are oriented to the inside and the outside, respectively.

Incidentally, the core-shell type micelle in which the hydrophobic part is a core and the hydrophilic part is a shell as described above is generally considered to be such a structure that the hydrophobic core is covered with the hydrophilic shell part and that the influence of the inside hydrophobic core to the outside solvent environment is hardly exhibited. However, details thereof are not clearly known.

The micellar structure according to the present invention is intended to form dispersed particles with a hydrophobic substance included therein, and the dispersed particles with the hydrophobic substance included therein are preferably polymeric microspheres. The polymeric microspheres are a generic name of fine particles of micrometer, submicron or nanometer order, which are formed using a polymer as a dispersant, and examples thereof include a polymer micelle formed of a polymer alone, a dispersed polymer particle containing a functional substance, which is insoluble or soluble to a polymer of a core part located inside, in the interior thereof, a polymer colloid, and so on.

As for means for confirming the inclusion of the hydrophobic substance, may be mentioned, for example, a method in which such a structure that the solubility to a solvent varies according to temperatures is introduced into a block segment of a block polymer and then a coloring material is included in the polymer to check the change in the dispersed state by changing the temperature, and observation of an ink composition through an electron microscope, whereby confirming the inclusion.

The crosslinking at the hydrophobic block segment part has a feature that the hydrophobic substance located inside becomes hard to flow out of the micelle.

An amphiphilic block polymer having a crosslinkable functional group in the hydrophobic block segment thereof is used as a dispersant, whereby the hydrophobic block segment is adsorbed on the hydrophobic substance, and the hydrophilic block segment thereof covers the periphery of the hydrophobic block segment. Crosslinking between the dispersed particles can be prevented by this hydrophilic block segment even when the crosslinkable functional group is crosslinked, and so the feature of the present invention resides in that the phenomenon of increase of coarse particles or viscosity, which has occurred in the conventional crosslinking method of dispersed particles, is hard to occur.

Figure 4:
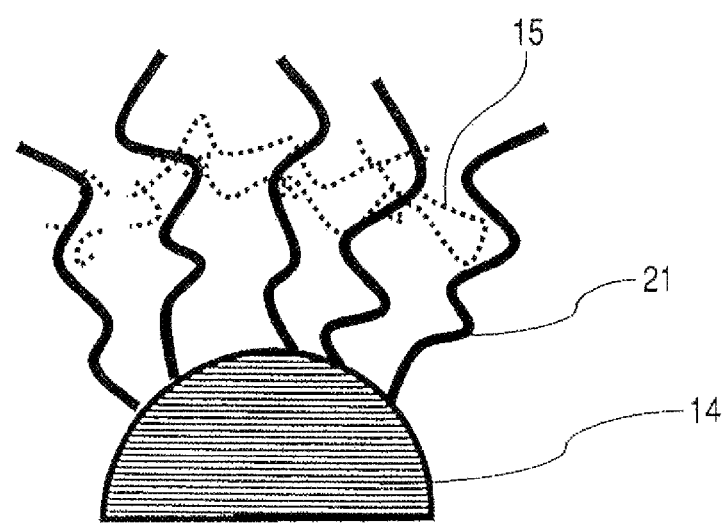
FIG. 4 is an enlarged partial typical view of FIG. 3.

As a preferred crosslinked structure of the dispersed particles contained in the composition according to the present invention, may be mentioned such a structure as illustrated in FIG. 4.

This structure is a function-separated structure composed of an adsorbing part adsorbed on the hydrophobic substance, a crosslinking part having a crosslinkable functional group on the outside thereof and a hydrophilic block segment having dispersibility. This structure is considered to be a more preferred structure because the adsorbing part is separately arranged on the core side of the crosslinking part, whereby the degree of freedom of the adsorbing part is ensured, the adsorbing capacity on the hydrophobic substance is not impaired, and the mobility of the crosslinking part is also good, and so a crosslinking reaction can be efficiently conducted.

Figure 5:
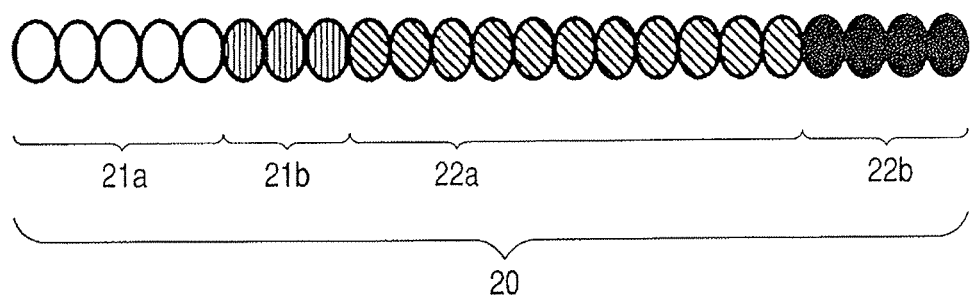
FIG. 5 is a typical view illustrating an example of a block polymer according to the present invention.
Figure 6:
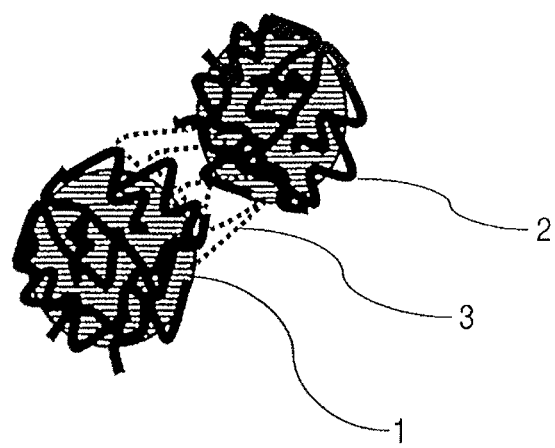
FIG. 6 is a typical view illustrating a crosslinked state of dispersed particles of the prior art.

This structure can also be attained by taking the structure as illustrated in FIG. 5 for the structure of a block polymer compound. (In the drawing, reference character 21a designates a hydrophobic adsorbing segment, 21b a hydrophobic crosslinking segment, 22a a nonionic hydrophilic block segment, and 22b an ionic hydrophilic block segment.)

When one should like to more ensure the effect to prevent crosslinking between dispersed particles of a block polymer compound that is the dispersing resin according to the present invention, it is preferable that the number of repeating units in the hydrophobic block segment in the block polymer compound be fewer than the number of repeating units in the hydrophilic block segment.

In the present application, the term "being crosslinked" means that the crosslinkable substituent contained in the hydrophobic block segment is being crosslinked by a crosslinking reaction. Examples of the substituent exhibiting crosslinkability include crosslinkable functional groups capable of forming a crosslinkage by a reaction with a crosslinking agent and self-crosslinkable functional groups capable of forming a crosslinkage without any crosslinking agent.

Examples of the crosslinkable functional groups include carboxyl, hydroxyl, tertiary amino, blocked isocyanate, epoxy and 1,3-dioxoran-2-one-4-yl groups. Among these, carboxyl, hydroxyl and epoxy groups are preferred because they are high in reactivity and easy to be introduced into a resin.

Then, typical examples of a combination of the crosslinkable functional group and the crosslinking agent are mentioned below.

When the crosslinkable functional group is a carboxyl group, examples of the crosslinking agent include amino resins, compounds having at least two epoxy groups in one molecule thereof and compounds having at least two 1,3-dioxoran-2-one-4-yl groups (also referred to as a cyclocarbonate group) in one molecule thereof.

When the crosslinkable functional group is a hydroxyl group, examples of the crosslinking agent include amino resins, polyisocyanate compounds and blocked polyisocyanate compounds.

When the crosslinkable functional group is a tertiary amino group, examples of the crosslinking agent include compounds having at least two epoxy groups in one molecule thereof and compounds having at least two 1,3-dioxoran-2-one-4-yl groups in one molecule thereof.

When the crosslinkable functional group is a blocked isocyanate group, examples of the crosslinking agent include compounds having at least two hydroxyl groups in one molecule thereof.

When the crosslinkable functional group is an epoxy group or 1,3-dioxoran-2-one-4-yl group, examples of the crosslinking agent include compounds having at least two carboxyl groups in one molecule thereof, polyamine compounds and polymercapto compounds.

Examples of the self-crosslinkable functional group include radically polymerizable unsaturated groups and hydrolyzable alkoxysilane groups. In order to reinforce the self-crosslinkability, each of a compound having at least two radically polymerizable unsaturated groups and a compound having at least two hydrolyzable alkoxysilane groups may also be partially used in combination.

Examples of the hydrolyzable alkoxysilane groups include methacryloxypropyltrimethoxysilane, vinyltriethoxysilane, vinyltrimethoxysilane and vinyltris(β-methoxyethoxy)silane.

The crosslinkable substituent contained in the hydrophobic block segment of the block polymer according to the present invention preferably does not impair the hydrophobicity of the hydrophobic block segment. Specific examples of the substituent include polymerizable unsaturated groups such as isocyanate and epoxy.

The block polymer compound contained in the ink composition according to the present invention is an amphiphilic block polymer compound whose at least one block segment is hydrophobic and whose at least one block segment is hydrophilic. Incidentally, the hydrophilicity means such a nature that it has a high affinity for water and is hence easy to be dissolved in water, while the hydrophobicity means such a nature that it has a low affinity for water and is hence hard to be dissolved in water.

Examples of the hydrophilic block include block segments containing a repeating structural unit having a hydrophilic unit such as a structure containing a carboxylic, carboxylate or hydrophilic oxyethylene unit in plenty and a structure having a hydroxyl group or the like. Specific examples thereof include block segments having a repeating structural unit represented by a hydrophilic monomer such as acrylic acid, methacrylic acid or a carboxylate such as an inorganic salt or organic salt thereof, a polyethylene glycol macromonomer, vinyl alcohol, or 2-hydroxyethyl methacrylate. However, the hydrophilic block in the block polymer compound contained in the ink composition according to the present invention is not limited thereto.

Examples of the hydrophobic block include block segments containing a repeating structural unit having a hydrophobic unit such as an isobutyl, t-butyl, phenyl, biphenyl or naphthyl group. Specific examples thereof include block segments having, as a repeating unit, a hydrophobic monomer such as styrene or t-butyl methacrylate. However, the hydrophobic block in the block polymer compound contained in the ink composition according to the present invention is not limited thereto.

Preferred forms of the amphiphilic block polymer compound contained in the ink composition according to the present invention will be described. The amphiphilic block polymer compound according to the present invention has at least two block segments, and the main chain structure thereof is preferably a polyalkenyl ether structure. To have a vinyl ether repeating structural unit is extremely useful in that a polymer material low in viscosity and good in dispersibility can be provided.

More preferably, a nonionic hydrophilic group and an ionic hydrophilic group are contained in at least one hydrophilic block segment. The block polymer compound has a nonionic hydrophilic block segment, whereby an ink composition, whose dispersion stability is not impaired even when environmental changes such as change in temperature or pH occur, and which is excellent in ejection performance in a thermal ink jet system in particular, is obtained.

Each block segment of the amphiphilic block polymer compound contained in the ink composition according to the present invention may be composed of a repeating unit derived from a single monomer or may be a structure having a repeating unit derived from a plurality of monomers. Examples of the block segment having the repeating unit derived from a plurality of monomers include random copolymers and gradient copolymers in which the compositional ratio is gradually changed. The block polymer compound according to the present invention may be a polymer obtained by graft-bonding such a block polymer as described above to another polymer.

To have at least two block segments permits exhibiting at least two functions. Therefore, a higher-order and minute structured material compared with a polymer compound composed of at most two block segments can be formed. Further, a similar nature may also be imparted to a plurality of block segments, thereby more stabilizing the nature.

In other words, the block polymer compound contained in the ink composition according to the present invention is preferably a block polymer, whose main chain structure is a polyalkenyl ether structure, and which has at least three block segments. To have at least three block segments permits separation of more functions.

As a preferable example of the block polymer compound contained in the ink composition according to the present invention, an amphiphilic block polymer compound, which is an ABC type triblock polymer composed of a hydrophobic block segment as a block A, a nonionic hydrophilic block segment as a block B and an ionic hydrophilic block segment as a block C, will hereinafter be described.

The hydrophobic block segment corresponding to the block A may be composed of only a repeating structural unit having a hydrophobic crosslinkable substituent, but is preferably a copolymer of a repeating structural unit having a crosslinkable substituent and a repeating structural unit exhibiting hydrophobicity and having no crosslinkable substituent. More preferably, the repeating structural unit having no crosslinkable substituent has a strong interaction with coloring materials. Examples of the copolymer include random copolymers, block copolymers and gradient copolymers.

In the ink composition according to the present invention, the content of the repeating structural unit having the crosslinkable substituent contained in the hydrophobic block segment of the block polymer compound is desirably within a range of from 1 to 99 mol %, preferably from 5 to 80 mol % based on the whole hydrophobic block segment. If the content is lower than 1 mol %, the crosslinking becomes insufficient, and so the fastness properties of the resulting image may be deteriorated in some cases. If the content exceeds 90 mol %, the interaction with a coloring material is hard to occur, and so it may be hard in some cases to include the coloring material in the resulting block polymer compound. It is hence not preferable to contain the repeating structural unit in such a too low or too high content.

Examples of the repeating structural unit having the crosslinkable substituent used in the present invention include the following structures. However, the present invention is not limited thereto.

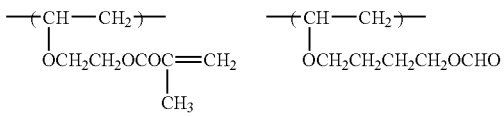

The hydrophobic block segment is preferably a block segment having a repeating structural unit composed of a polyalkenyl ether structure. Specific examples thereof include such repeating structural units as represented by the following general formula (1) or general formula (2). However, the hydrophobic blocks in the block polymer compound according to the present invention are not limited thereto.

General Formula (1)

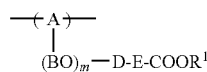

In the general formula (1), A denotes a polyalkenyl ether group, which may be substituted. The polyalkenyl ether group may be substituted by a linear or branched alkyl group having 1 to 5 carbon atoms, or a halogen atom.

B denotes a linear or branched alkylene group having 1 to 15 carbon atoms, which may be substituted. Examples of the substituent on the alkylene group include ethylene, propylene and butylene.

m is an integer of from 0 to 30, preferably from 1 to 10. When m is a plural number, the respective B groups may be different from each other.

D denotes a single bond or a linear or branched alkylene group having 1 to 10 carbon atoms, which may be substituted. Examples of the alkylene group include methylene, ethylene, propylene, butylene, pentylene, hexylene, heptylene and octylene.

E denotes an aromatic ring, which may be substituted, a fused ring, which may be substituted, a structure in which at most 3 aromatic rings, which may be substituted, are bonded via a single bond, or a methylene group. Examples of the aromatic ring structure include phenyl, pyridylene, pyrimidyl, naphthyl, anthranyl, phenanthranyl, thiophenyl and furanyl.

$R^1$ denotes a linear or branched alkyl group having 1 to 5 carbon atoms, which may be substituted, or an aromatic ring, which may be substituted. Examples of the aromatic ring structure include phenyl, pyridyl and biphenyl groups. Examples of the substituent include alkyl and alkoxy groups.

In any of the aromatic ring or methylene group, a hydrogen atom, which is not substituted by $R^1$, may be substituted. Examples of the substituent include alkyl groups, alkoxy groups and halogen atoms.

General Formula (2)

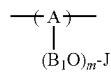

In the general formula (2), A denotes a polyalkenyl ether group, which may be substituted. The alkylene group making up the polyalkenyl ether group may be substituted by a linear or branched alkylene group having 1 to 5 carbon atoms, or a halogen atom.

$B_1$ denotes a linear or branched alkylene group having 1 to 15 carbon atoms, which may be substituted. Examples of the substituent on the alkylene group include ethylene, propylene and butylene.

m is an integer of from 0 to 30, preferably from 1 to 10. When m is a plural number, the respective $B_1$ groups may be different from each other.

J denotes a linear or branched alkyl group having 3 to 15 carbon atoms, which may be substituted, an aromatic ring, which may be substituted, a fused ring, which may be substituted, or a structure in which at most 3 aromatic rings, which may be substituted, are bonded via a single bond. Examples of the alkyl group include propyl, isopropyl, butyl and t-butyl groups. Examples of the aromatic ring structure include phenyl, naphthyl, pyridyl and biphenyl groups. Examples of the substituent include alkyl and alkoxy groups.

Specific examples of the repeating structural unit, which becomes a hydrophobic block, include the following structures. However, such units are not limited thereto.

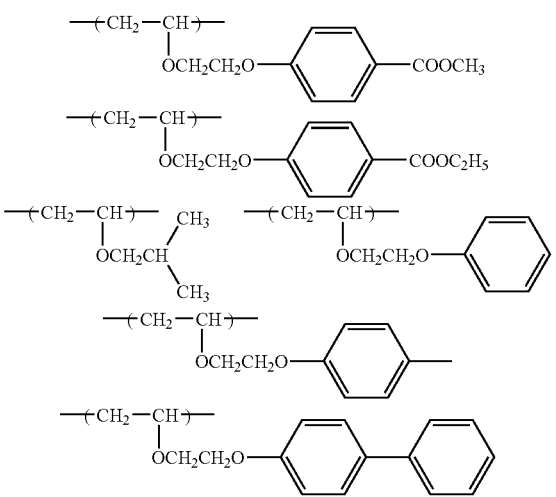

Examples of the block B, which is a nonionic hydrophilic block segment, include block segments containing a repeating structural unit having a hydroxyl group, a polyoxyethylene chain or the like as a substituent or a side chain. Specific examples thereof include block segments having a monomer such as polyvinyl alcohol as a repeating unit. Block segments having a repeating structural unit composed of a polyalkenyl ether structure are preferred. Specific examples thereof include such repeating structural units as represented by the following general formula (3). However, the nonionic hydrophilic blocks in the polymer compound according to the present invention are not limited thereto.

General Formula (3)

In the general formula (3), A denotes a polyalkenyl ether group, which may be substituted. The alkenyl group making up the polyalkenyl ether group may be substituted by a linear or branched alkyl group having 1 to 5 carbon atoms, or a halogen atom.

B' denotes a linear or branched alkylene group having 1 to 5 carbon atoms, which may be substituted. A linear alkylene group having 1 or 2 carbon atoms is preferred. Examples of the substituent on the alkylene group include methylene, ethylene and propylene.

m is an integer of from 0 to 30, preferably from 1 to 10. When m is a plural number, the respective B' groups may be different from each other.

D' denotes a single bond or a linear or branched alkylene group having 1 to 5 carbon atoms, which may be substituted. Examples of the alkylene group include methylene, ethylene and propylene.

K denotes a linear or branched alkyl group having 1 to 3 carbon atoms, which may be substituted, or a hydroxyl group. Examples of the alkyl group include methyl, ethyl and propyl groups.

The repeating structural unit represented by the general formula (3) exhibits hydrophilicity. Accordingly, the above-described structure includes, as a single unit, a case where it is hydrophilic like an oxyethylene or hydroxyl group or a case where it is hydrophobic like an oxypropylene, ethyl or propyl group. In this case, it must be hydrophilic as a whole. Therefore, when K is a propyl group, $(B'O)_m$ comes to be a somewhat long oxyethylene group. When K is a hydroxyl group, $(B'O)_m$ comes to be an oxypropylene group. Specific examples of the repeating structural unit, which becomes a nonionic hydrophilic block, include the following structures. However, such units are not limited thereto.

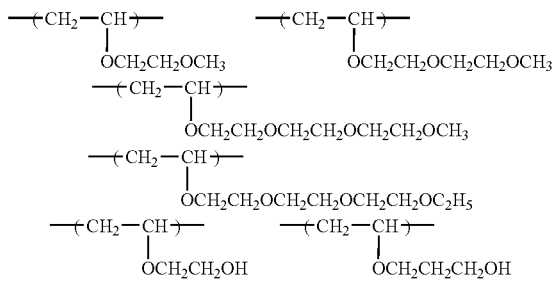

Examples of the block C, which is an ionic hydrophilic block segment, include block segments containing a repeating structural unit having a carboxylic acid, carboxylic acid salt or the like. Block segments having a repeating structural unit composed of a polyalkenyl ether structure are preferred. Specific examples thereof include such repeating structural units as represented by the following general formula (4). However, the ionic hydrophilic blocks in the polymer compound according to the present invention are not limited thereto.

General Formula (4)

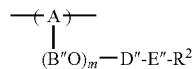

In the general formula (4), A denotes a polyalkenyl ether group, which may be substituted. The polyalkenyl ether group may be substituted by a linear or branched alkyl group having 1 to 5 carbon atoms, or a halogen atom.

B" denotes a linear or branched alkylene group having 1 to 15 carbon atoms, which may be substituted. Examples of the substituent on the alkylene group include ethylene, propylene and butylene.

m is an integer of from 0 to 30, preferably from 1 to 10. When m is a plural number, the respective B" groups may be different from each other.

D" denotes a single bond or a linear or branched alkylene group having 1 to 10 carbon atoms, which may be substituted. Examples of the alkylene group include methylene, ethylene, propylene, butylene, pentylene, hexylene, heptylene and octylene.

E" denotes an aromatic ring, which may be substituted, a fused ring, which may be substituted, a structure in which at most 3 aromatic rings, which may be substituted, are bonded via a single bond, or a methylene group. Examples of the aromatic ring structure include phenyl, pyridylene, pyrimidyl, naphthyl, anthranyl, phenanthranyl, thiophenyl and furanyl.

$R^2$ denotes a structure of —COO$^-$M. M denotes a monovalent or polyvalent metal cation. Specific examples of M include sodium, potassium and lithium as monovalent metal cations, and magnesium, calcium, nickel and iron as polyvalent metal cations. When M is a polyvalent metal cation, M forms a counter ion with at least two COO$^-$ anions.

In any of the aromatic ring or methylene group, a hydrogen atom, which is not substituted by $R^2$, may be substituted. Examples of the substituent include alkyl groups, alkoxy groups and halogen atoms.

The segment C preferably has, in a side chain thereof, an aromatic carboxylic acid derivative with a carboxyl group bonded to an aromatic carbon.

Specific examples of the repeating structural unit, which becomes an ionic hydrophilic block, include the following structures. However, such units are not limited thereto.

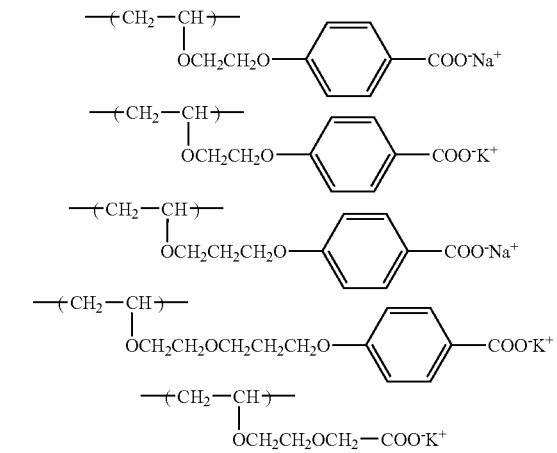

The content of the hydrophobic block segment contained in the amphiphilic block polymer compound according to the present invention is within a range of from 5 to 95% by weight, preferably from 10 to 90% by weight, and the content of the hydrophilic block segment is within a range of from 5 to 95% by weight, preferably from 10 to 90% by weight.

When the block polymer compound is an ABC type triblock polymer compound, the content of the hydrophobic block segment A having a polymerizable substituent in the block segments A, B and C is within a range of from 5 to 95% by weight, preferably from 5 to 90% by weight. The content of the nonionic hydrophilic block segment B is within a range of from 5 to 95% by weight, preferably from 10 to 90% by weight. The content of the ionic hydrophilic block segment C is within a range of from 1 to 90% by weight, preferably from 1 to 80% by weight.

The number average molecular weight (Mn) of the polymer compound contained in the ink composition according to the present invention is within a range of from 500 to 10,000,000, preferably from 1,000 to 1,000,000 If the molecular weight exceeds 10,000,000, entanglement within a polymer chain and between polymer chains becomes too much, and so such a polymer is hard to be dispersed in a solvent. If the molecular weight is lower than 500, the molecular weight may be too low to develop a steric effect as a polymer. Preferable polymerization degrees of the respective block segments are, independently of each other, from 3 to 10,000, preferably from 3 to 5,000, more preferably from 3 to 4,000.

The polymerization of the polymer compound contained in the ink composition according to the present invention is often mainly conducted by cationic polymerization. Examples of an initiator include a protonic acid such as hydrochloric acid, sulfuric acid, methanesulfonic acid, trifluoroacetic acid, trifluoromethanesulfonic acid or perchloric acid, or combinations of a Lewis acid such as $BF_3$, $AlCl_3$, $TiCl_4$, $SnCl_4$, $FeCl_3$, $RAlCl_2$ or $R_{1.5}AlCl_{1.5}$ (R is alkyl) with a cationogen (examples of the cationogen include protonic acids, water, alcohols and adducts of vinyl ether and a carboxylic acid). A polymerization reaction is allowed to progress by causing these initiators to coexist with polymerizable compounds (monomers), whereby the polymer compound can be synthesized.

A polymerization process more preferably used in the present invention will be described. Many synthesizing processes for a polymer containing a polyvinyl ether structure have been reported (for example, Japanese Patent Application Laid-Open No. H11-080221). Processes according to cationic living polymerization by Aoshima, et al. (Journal of Polymer Bulletin, Vol. 15, p. 417, 1986; and Japanese Patent Application Laid-Open Nos. H11-322942 and H11-322866) are representative thereof. By conducting polymer synthesis according to the cationic living polymerization, various polymers such as homopolymers, copolymers composed of two or more monomers, block polymers, graft polymers and gradient polymers can be synthesized with their chain lengths (molecular weights) made exactly uniform. Besides, the living polymerization may also be conducted in an $HI/I_2$ system, $HCl/SnCl_4$ system or the like.

The content of the polymer compound contained in the ink composition according to the present invention is within a range of from 0.1% by mass to 90% by mass, preferably from 1% by mass to 80% by mass. When the ink composition is used for ink-jet printers, the polymer compound is preferably used in an amount of from 1% by mass to 30% by mass.

The hydrophobic substance contained in the ink composition according to the present invention will now be described in detail. The hydrophobic substance contained in the ink composition according to the present invention is a substance insoluble in water. The term "insoluble in water" means a nature incapable of being dissolved or dispersed in water. More specifically, the nature means that the solubility of a compound in water is at most 1 g/l, or no dispersed particle stable to water is formed.

Examples of hydrophobic substances used in the present invention include pigments, metal particles, organic fine particles, inorganic fine particles, magnetic substance particles, organic semiconductors, electrically conductive materials, optical materials and non-linear optical materials. However, the hydrophobic substances are not limited thereto so far as they develop their function even when included in the dispersing resin.

The hydrophobic substance contained in the ink composition according to the present invention is preferably a coloring material such as a pigment or dye, with the pigment being more preferred.

Specific examples of pigments and dyes used in ink compositions are mentioned below.

The pigments may be either organic pigments or inorganic pigments. As pigments used in inks, may preferably be used black pigments and pigments of three primary colors of cyan, magenta and yellow. Incidentally, other color pigments than those described above, colorless or light-colored pigments and metalescent pigments may also be used. Pigments newly synthesized for the present invention may also be used.

Examples of commercially available pigments in black, cyan, magenta and yellow are mentioned below.

As examples of black pigments, may be mentioned Raven 1060 (product of Columbian Carbon Company), MOGUL-L (product of Cabot Company), Color Black FW1 (product of Degussa AG) and MA100 (product of Mitsubishi Chemical Corporation). However, the present invention is not limited thereto.

As examples of cyan pigments, may be mentioned C.I. Pigment Blue 15:3, C.I. Pigment Blue 15:4 and C.I. Pigment Blue 16. However, the present invention is not limited thereto.

As examples of magenta pigments, may be mentioned C.I. Pigment Red 122, C.I. Pigment Red 123 and C.I. Pigment Red 146. However, the present invention is not limited thereto.

As examples of yellow pigments, may be mentioned C.I. Pigment Yellow 74, C.I. Pigment Yellow 128 and C.I. Pigment Yellow 129. However, the present invention is not limited thereto.

The pigment used in the ink composition according to the present invention is preferably used in an amount of from 0.1 to 50% by mass based on the weight of the ink composition. When the amount of the pigment is not less than 0.1% by mass, a preferred image density can be achieved. When the amount is not greater than 50% by mass, the pigment exhibits preferred dispersibility. A more preferable range of the amount is from 0.5 to 30% by mass.

In the ink composition according to the present invention, dyes may also be used. Such oil-soluble dyes, and insoluble colorants such as disperse dyes as described below may be used.

As examples of oil-soluble dyes, commercially available products of various colors are mentioned below.

As examples of oil-soluble dyes of black, may be mentioned C.I. Solvent Black 3, 22:1 and 50. However, the present invention is not limited thereto.

As examples of oil-soluble dyes of yellow, may be mentioned C.I. Solvent Yellow 1, 25:1 and 172. However, the present invention is not limited thereto.

As examples of oil-soluble dyes of orange, may be mentioned C.I. Solvent Orange 1, 40:1 and 99. However, the present invention is not limited thereto.

As examples of oil-soluble dyes of red, may be mentioned C.I. Solvent Red 1, 111 and 229. However, the present invention is not limited thereto.

As examples of oil-soluble dyes of violet, may be mentioned C.I. Solvent Violet 2, 11 and 47. However, the present invention is not limited thereto.

As examples of oil-soluble dyes of blue, may be mentioned C.I. Solvent Blue 2, 43 and 134. However, the present invention is not limited thereto.

As examples of oil-soluble dyes of green, may be mentioned C.I. Solvent Green 1, 20 and 33. However, the present invention is not limited thereto.

As examples of oil-soluble dyes of brown, may be mentioned C.I. Solvent Brown 1, 12 and 58. However, the present invention is not limited thereto.

Incidentally, these examples of the coloring materials described above are preferred for the ink compositions according to the present invention. However, the coloring materials used in the ink compositions according to the present invention are not particularly limited to the above coloring materials. The dye used in the ink composition according to the present invention is preferably used in an amount of from 0.1 to 50% by mass based on the weight of the ink composition.

The ink compositions according to the present invention will hereinafter be described in more details.

Other components than the polymer compound or hydrophobic substance contained in the compositions according to the present invention will hereinafter be described in detail. The other components include aqueous media, additives and the like.

<Aqueous Medium>

The aqueous medium referred to in the invention of the present application is composed mainly of water and may contain other organic solvents or hydrophilic solvents than water so far as the above-described polymer compound and hydrophobic substance are dispersed in a micellar state therein.

Water included in the present invention is preferably ion-exchanged water from which metal ions and the like are removed, pure water or ultra pure water.

Examples of the organic solvents include hydrocarbon solvents, aromatic solvents, ether solvents, ketone solvents, ester solvents and amide solvents.

Examples of usable aqueous solvents include polyhydric alcohols such as ethylene glycol, diethylene glycol, triethylene glycol, polyethylene glycol, propylene glycol, polypropylene glycol and glycerol, polyhydric alcohol ethers such as ethylene glycol monomethyl ether, ethylene glycol monoethyl ether, ethylene glycol monobutyl ether, diethylene glycol monoethyl ether and diethylene glycol monobutyl ether, and nitrogen-containing solvents such as N-methyl-2-pyrrolidone, substituted pyrrolidone and triethanolamine. In order to accelerate drying of the aqueous dispersion on a recording medium, a monohydric alcohol such as methanol, ethanol or isopropanol may also be used.

<Additives>

To the compositions according to the present invention, various additives and auxiliary agents may be added as needed. An example of the additives is a dispersion stabilizer, by which a pigment is stably dispersed in a medium. The compositions according to the present invention have a function of dispersing a particulate solid such as a pigment by virtue of the polymer containing the polyvinyl ether structure. However, any other dispersion stabilizer may be added when dispersion is insufficient.

As other dispersion stabilizers, may be used resins or surfactants having both hydrophilic part and hydrophobic part. Examples of the resin having both hydrophilic part and hydrophobic part include copolymers of a hydrophilic monomer and a hydrophobic monomer.

Examples of the hydrophilic monomer include acrylic acid, methacrylic acid, maleic acid, fumaric acid, monoesters of the carboxylic acids described above, vinylsulfonic acid, styrenesulfonic acid, vinyl alcohol, acrylamide and methacryloxyethyl phosphate. Examples of the hydrophobic monomer include styrene, styrene derivatives such as α-methylstyrene, vinylcyclohexane, vinylnaphthalene derivatives, acrylic acid esters and methacrylic acid esters. The copolymer may be in any form of random, block and graft copolymers. Both hydrophilic monomers and hydrophobic monomers are not limited to those described above.

As the surfactants, may be used anionic, nonionic, cationic and amphoteric surfactants. Examples of the anionic surfactants include fatty acid salts, alkylsulfate salts, alkylarylsulfonic acid salts, alkyl diaryl ether disulfonic acid salts, dialkylsulfosuccinic acid salts, alkylphosphonic acid salts, naphthalenesulfonic acid-formalin condensates, polyoxyethylene alkyl phosphate salts and glycerol borate fatty acid esters. Examples of the nonionic surfactants include polyoxyethylene alkyl ethers, polyoxyethylene-oxypropylene block copolymers, sorbitan fatty acid esters, glycerol fatty acid esters, polyoxyethylene fatty acid esters, polyoxyethylene alkylamines, fluorine-containing surfactants and silicon-containing surfactants. Examples of the cationic surfactants include alkylamine salts, quaternary ammonium salts, alkylpyridinium salts and alkylimidazolium salts. Examples of the amphoteric surfactants include alkylbetaines, alkylamine oxides and phosphatidylcholine. Incidentally, the surfactants are also not limited to those described above.

To the compositions according to the present invention, may be added an aqueous solvent as needed. When the composition is used as an ink-jet ink in particular, the hydrophilic solvent is used for the purpose of preventing drying of the ink in a nozzle part and solidification of the ink. The aqueous solvents may be used either singly or in any combination thereof. As the aqueous solvents, those mentioned above may be used as they are. When the composition is an ink, the content thereof is within a range of from 0.1 to 60% by mass, preferably from 1 to 40% by mass based on the total weight of the ink.

When the composition is used as, for example, an ink, pH adjustors for achieving stabilization of the ink and stability of the ink to piping in a recording apparatus, penetrants for accelerating penetration of the ink into a recording medium to facilitate apparent drying, mildewproofing agents for preventing occurrence of mildew in the ink, chelating agents for blocking metal ions in the ink to prevent deposition of metals in a nozzle part and deposition of insoluble matter in the ink, antifoaming agents for preventing occurrence of foams upon circulation or transferring of a recording liquid or preparation of the recording liquid, and besides, antioxidants, mildewproofing agents, viscosity modifiers, conductivity-imparting agents, ultraviolet absorbents, etc. may also be added as other additives.

<Crosslinking Agent>

To the ink compositions according to the present invention, a crosslinking agent selected by the above-described combination of the crosslinkable functional group and the crosslinking agent may be added according to the kind of the crosslinkable substituent used. Upon the preparation of the ink composition, the crosslinking agent is added before or after the dispersion of a pigment. The timing is preferably before the dispersion because the probability that the crosslinking agent is present on the surface of the pigment is high.

The crosslinking of the polymer compound in the present invention is conducted by dispersing the polymer compound and the pigment in an aqueous medium composed of water and an optional water-soluble organic solvent or the like to form polymer microspheres as dispersed particles, and then subjecting the dispersed particles to heating under ordinary pressure or high pressure, irradiation of energy rays, or the like. In this case, the crosslinking may be conducted in the presence of a catalyst or a polymerization initiator.

With respect to the solid content concentration in the resultant dispersion liquid upon the crosslinking, the distance between dispersed pigment particles is short when the solid content concentration in the dispersion liquid is high, so that pigment particles may be aggregated to each other by the crosslinking. Therefore, the concentration is preferably adjusted within a range of at most 20% by mass, more preferably a range of from 0.1 to 10% by mass by adding water or the like in advance. Examples of self-crosslinking by a carboxyl group and an epoxy group, self-crosslinking by a hydroxyl group and an N-alkoxymethylamide group, or self-crosslinking by a hydrolyzable alkoxysilane group include crosslinking caused by heating at 50 to 150° C. under ordinary pressure or high pressure. In this case, it may also be recommended to use a catalyst.

In the case of self-crosslinking by a radically polymerizable unsaturated group, the crosslinking may be conducted at a temperature of about 50 to 90° C. by adding a water-soluble polymerization initiator such as potassium persulfate or ammonium persulfate and besides by using a redox polymerization system.

On the other hand, the crosslinking using the crosslinking agent is preferably crosslinking caused by heating at 50 to 100° C. under ordinary pressure. However, the crosslinking may also be conducted at about 100 to 150° C. under high pressure in some cases. In this case, it may also be recommended to use a catalyst.

The crosslinking agent, which may be added to the compositions according to the present invention, is characterized in that it is a hydrophobic compound. The crosslinking agent used in the compositions according to the present invention is preferably hydrophobic because the crosslinkable substituent of the polymer compound is contained in the hydrophobic block segment. However, that soluble or dispersible in water may also be used.

Further, the crosslinking agent contained in the composition according to the present invention is preferably a polymer compound.

The mixing proportion of the polymer compound to the crosslinking agent is generally within a range of preferably from 30:70 to 95:5 in terms of the weight ratio of solid content, particularly preferably from 40:60 to 90:10.

The ink composition according to the present invention can be prepared by mixing the constituent components described above and uniformly dissolving or dispersing the resultant mixture. For example, a plurality of the constituent components are mixed, the resultant mixture is pulverized and dispersed by means of a sand mill, ball mill, homogenizer, nanomizer or the like to prepare an ink mother liquor, and a solvent and additives are added to this liquor to adjust its physical properties, whereby the ink composition can be adjusted.

The preparation process of the composition according to the present invention will now be described in detail.

The preparation process of the composition according to the present invention comprises producing the above-described dispersed particles by a polymerization reaction of an amphiphilic macromonomer with a polymerizable substituent substituted into a hydrophobic block segment.

As the preparation process of the composition according to the present invention, may be mentioned, for example, the following process. However, the present invention is not limited thereto.

The composition according to the present invention can be prepared by mixing the amphiphilic block polymer, hydrophobic substance, crosslinking agent, solvent, additives and the like, which are the constituent components described above, and uniformly dissolving or dispersing the resultant mixture. For example, a plurality of the constituent components are mixed, the resultant mixture is pulverized and dispersed by means of a dispersing machine such as a sand mill, ball mill, homogenizer or nanomizer to prepare an ink mother liquor, and a solvent and additives are added to this liquor to adjust its physical properties, whereby the composition can be prepared. In order to prepare a uniform composition, an emulsion phase inversion process is preferably used.

In this case, the crosslinking agent may be added before the dispersion or added as an additive after the dispersion. An amphiphilic polymer having a self-crosslinkable functional group may also be added without adding any crosslinking agent.

When a polymer having a crosslinkable functional group is used as the crosslinking agent, it is preferably added before the dispersion.

The dispersed particles are then subjected to heating under ordinary pressure or high pressure, irradiation of energy rays, or a reaction under specific conditions, whereby the crosslinkable functional group can be subjected to a crosslinking reaction to form crosslinkage.

The composition according to the present invention is an aqueous composition containing a solvent. The aqueous composition means a composition whose main solvent is water. The composition according to the present invention is preferably an ink composition. An ink jet composition is more preferred. The ink jet composition means a composition capable of being ejected by an ink ejecting method using an ink jet method, which will be described subsequently.

With respect to the ink jet composition, the conditions of composition properties such as viscosity, size of dispersed fine particles and storage stability may be generally severe in some cases compared with the ink composition. For the ejecting method by the ink jet method, ejection of the composition is conducted through micro-nozzles, so that it is particularly preferable that the viscosity of the composition is low, the size of fine particles in the composition is small, and the storage stability is excellent.

As a factor for the deterioration of ejection, may be generally mentioned, for example, the presence of coarse particles.

The present invention is considered to be extremely useful in that a composition little in coarse particles which are the factor for the deterioration of ejection, and a preparation process thereof can be provided.

An image forming process, liquid applying method and image forming apparatus making use of the compositions according to the present invention will now be described.

<Image Forming Process, Liquid Applying Method and Apparatus>

The compositions according to the present invention can be used in various image forming processes and apparatus such as various kinds of printing methods, ink jet methods and electrophotographic methods, and the like, and images can be formed by an image forming method using such an apparatus. When a liquid composition is used, it may be used for forming a minute pattern by an ink jet method or the like, or in a liquid application method for administering a drug.

The image forming process according to the present invention is a process for forming an excellent image with the compositions according to the present invention. The image forming process according to the present invention is preferably an image forming process comprising ejecting the ink composition according to the present invention from an ink ejecting part to apply the ink composition on to a recording medium, thereby conducting recording. As for the formation of the image, is preferably used a method using the ink jet method in which thermal energy is applied to an ink to eject the ink.

As for an ink jet printer using the ink-jet ink compositions according to the present invention, it is applicable to various ink jet recording apparatus of a piezoelectric ink jet system using piezoelectric elements, a BUBBLE JET (registered trademark) system in which thermal energy is caused to act to effect bubbling to conduct recording, and the like.

According to the present invention, a head which is equipped with a means for generating thermal energy as energy used for ejecting an ink-jet ink (for example, an electrothermal converter or laser beam) and ejects the ink-jet ink by the thermal energy brings about an excellent effect. According to such a system, the formation of a high-definition image can be achieved. The formation of a far excellent image can be achieved by using the ink-jet ink compositions according to the present invention.

With respect to the typical construction and principle of the apparatus equipped with the means for generating thermal energy, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal which corresponds to ejection information and gives a rapid temperature rise exceeding nuclear boiling is applied to an electrothermal converter arranged corresponding to a liquid path, in which a liquid is held, thereby causing the electrothermal converter to generate thermal energy to cause film boiling on the heat-acting surface of a head, so that a bubble can be formed in the liquid in response to the driving signal in relation of one to one. The liquid is ejected through an ejection opening by the growth-contraction of this bubble to form at least one droplet. When this driving signal is applied in the form of a pulse, the growth-contraction of the bubble is suitably conducted in a moment, so that the ejection of the liquid can be achieved with excellent responsiveness in particular. It is therefore preferable to use such pulsed signals. As the pulsed driving signal, such signals as described in U.S. Pat. Nos. 4,463,359 and 4,345,262 are suitable. When the conditions described in U.S. Pat. No. 4,313,124 that discloses an invention relating to the rate of temperature rise on the heat-acting surface are used, far excellent ejection can be conducted.

As the construction of the head, such combined constructions of ejection openings, a liquid flow path and electrothermal converters as disclosed in the above-described publications (linear liquid flow path or perpendicular liquid flow path) constructions based on U.S. Pat. Nos. 4,558,333 and 4,459,600 which disclose such a construction that a heat-acting portion is arranged in a curved region are also included in the present invention. In addition, constructions based on Japanese Patent Application Laid-Open No. S59-123670 which discloses such a construction that a slit common to a plurality of electrothermal converters are used as an ejection part of the electrothermal converters, and Japanese Patent Application Laid-Open No. S59-138461 which discloses such a construction that an opening absorbing a pressure wave of thermal energy is provided in opposition to an ejection part are also effective for the present invention. In other words, ejection of the ink-jet ink can be efficiently performed with certainty according to the present invention even when the type of the head is any type.

Further, the present invention may be effectively applied to a full-line type head having a length corresponding to the maximum width of a recording medium in the image forming apparatus of the present invention. Such a head may be either of the construction to satisfy the length by a combination of a plurality of recording heads or of the construction comprised of one recording head integrally formed.

In addition, the present invention is effective even in a serial type head so far as the head is fixed to an apparatus body, or even when a replaceable chip type head, in which electrical connection to an apparatus body and feed of an ink from the apparatus body become feasible by installing the head in the apparatus body, is used.

Further, the apparatus according to the present invention may additionally have a liquid droplet removing means. When such a means is added, a far excellent ejecting effect can be realized.

Still further, addition of preliminary auxiliary means and the like is preferred for the construction of the apparatus according to the present invention because the effects brought by the present invention can be more stabilized. As specific examples thereof, may be mentioned capping means for the head, pressurizing or sucking means, preliminary heating means for conducting heating by using electrothermal converters, other heating elements than these or a combination thereof, and preliminary ejecting means for conducting ejection separate from ejection of an ink.

What is most effective for the present invention is that which carries out the film boiling system described above.

In the apparatus of the present invention, the amount of the ink ejected from each ejection orifice of the head, which ejects the ink-jet ink, is preferably within a range of from 0.1 picoliter to 100 picoliters.

The ink compositions according to the present invention may also be used in indirect recording apparatus making use of a recording system in which an ink is applied to an intermediate transfer material, and the applied ink is then transferred to a recording medium such as paper. Further, the ink compositions may also be applied to apparatus making use of an intermediate transfer material handled by a direct recording system.

The present invention will hereinafter be described in detail by the following Examples.

However, the present invention is not limited to these examples.

Synthesis Example 1

Synthesis of Block Polymer 1

ABCD Type

Polymerization was conducted in the following manner according to a publicly known cationic living polymerization.

After the interior of a glass container equipped with a three-way stopcock was purged with nitrogen, the container was heated to 250° C. under a nitrogen gas atmosphere to remove adsorbed water. After the system was returned to room temperature, 25 mmol (millimols) of 4-methylbenzeneoxyethyl vinyl ether (TolOVE), 160 mmol of ethyl acetate, 0.5 mmol of 1-isobutoxyethyl acetate and 110 ml of toluene were added to cool the reaction system. At the time the temperature within the system reached 0° C., 2.0 mmol of ethylaluminum sesquichloride (equimolar mixture of diethylaluminum chloride and ethylaluminum dichloride) was added to initiate polymerization. The polymerization reaction was monitored by means of gel permeation chromatography (GPC) to confirm that the polymerization of a block A had been completed. At this stage, Mn was 7,000, and Mw/Mn was 1.10.

Then, 25 mmol of 2-vinyloxyethyl methacrylate (VEMA), which was a monomer for a block B, was added to continue the polymerization. After completion of the polymerization of the block B was confirmed by monitoring using GPC (at this stage, Mn was 14,400, and Mw/Mn was 1.18), 50 mmol of methoxyethoxyethyl vinyl ether (MOEOVE), which was a monomer for a block C, was then added to continue the polymerization. After completion of the polymerization of the block C was confirmed by monitoring using GPC (at this stage, Mn was 28,100, and Mw/Mn was 1.19), 10 mmol of t-butyldimethylsilyl 4-{(vinyloxy)ethoxy}benzoate (VEEtPhCOOTBDMSi), which was a monomer for a block D, was added to continue the polymerization. After completion of the polymerization of the block D was confirmed by monitoring using GPC, the polymerization reaction was terminated. The termination of the polymerization reaction was conducted by adding a 0.3% by mass aqueous solution of ammonia/methanol into the system. The reaction mixture solution was diluted with dichloromethane and washed 3 times with 0.6 M hydrochloric acid and then 3 times with distilled water. The resultant organic phase was concentrated to dryness by means of an evaporator, and vacuum-dried, thereby isolating the intended block polymer. The identification of this block polymer was conducted by means of NMR and GPC. Mn was 34,400, and Mw/Mn was 1.17. The polymerization ratio of A:B:C:D was 50:50:100:20.

Then, 1 g of the thus-obtained block polymer was dissolved in 45 ml of THF, 5 ml of a 3N HCl/ethanol solution was added, the resultant mixture was stirred for 3 hours at room temperature (23° C.), and 20 ml of ethanol was then added to stir the mixture additionally for 3 hours. The reaction was monitored by means of NMR, and the reaction mixture was neutralized with sodium carbonate after hydrolysis was completed by 100% to end the reaction. After the reaction mixture was filtered, the resultant filtrate was concentrated by means of an evaporator and extracted with methylene chloride, the resultant extract was dried, and the solvent was then distilled off to obtain a block polymer in which a side chain of the block D is in the form of a free carboxylic acid polymer. It was also confirmed by NMR that almost all the double bonds in VEMA are left.

The block polymer was neutralized with an equiamount of 1N sodium hydroxide, and water was distilled off to obtain Block Polymer 1 in which the side chain of the block D is in the form of sodium carboxylate.

In the above-described experimental process, the concentration by the evaporator and distilling-off of water were conducted at a low temperature of 40° C. or lower for the purpose of inhibiting a reaction of the unsaturated bond in VEMA.

Synthesis Example 2

Synthesis of Block Polymer 2

ABC Type

Synthesis was conducted in the same manner as in Synthesis Example 1 except that the monomers of the respective components were changed as described below. As the monomers for the block A, were added 50 mmol of TolOVE and 50 mmol of VEMA. As the monomer for the block B, was added 50 mmol of methoxyethoxyethyl vinyl ether (MOEOVE). As the monomer for the block C, was added 10 mmol of t-butyldimethylsilyl 4-{(vinyloxy)ethoxy}benzoate (VEEtPhCOOTBDMSi). The other processes than the above is the same as in Example 1. The identification of this block polymer was conducted by means of NMR and GPC. Mn was 43,700, and Mw/Mn was 1.17. The polymerization ratio of A:B:C was 100:100:20, and the compositional ratio TolOVE:VEMA in the segment A was 5:5.

The thus-obtained block polymer was subjected to a post treatment in the same manner as in Synthesis Example 1 to obtain Block Polymer 2 in which the side chain of the block C is in the form of sodium carboxylate. It was also confirmed by NMR that almost all the double bonds in VEMA are left.

Synthesis Example 3

Synthesis of Block Polymer 3

Polymerization was conducted in the same manner as in Synthesis Example 1 except that the monomers of the respective components were changed. First of all, the monomers for the component A were changed to 35 mmol of TolOVE and 15 mmol of VEMA. As the component B, was added a toluene-diluted solution of 50 mmol of MOEOVE and 10 mmol of VEEtPhCOOTBDMSi. The other processes than the above is the same as in Example 1. The identification of this block polymer was conducted by means of NMR and GPC. Mn was 33,900, and Mw/Mn was 1.19. The polymerization ratio of A:B was 100:120, the compositional ratio TolOVE:VEMA in the segment A was 7:3, and the compositional ratio MOEOVE:VEEtPhCOOTBDMSi in the segment B was 5:1.

The thus-obtained block polymer was subjected to a post treatment in the same manner as in Synthesis Example 1 to obtain Block Polymer 3 in which the side chain of the block B is in the form of sodium carboxylate. It was also confirmed by NMR that almost all the double bonds in VEMA are left.

Synthesis Example 4

Synthesis of Polymer 1

Hydrophobic Polymer Unit Precursor

Synthesis of random polymer of 4-methylbenzeneoxyethyl vinyl ether (TolOVE) and 2-vinyloxyethyl methacrylate (VEMA)

Polymerization was conducted by adding 15 mmol (millimols) of 4-methylbenzeneoxyethyl vinyl ether (TolOVE) and 15 mmol of 2-vinyloxyethyl methacrylate (VEMA) as monomers in the same manner as in Synthesis Example 1. The other conditions than the above are the same as in Synthesis Example 1. Monitoring using GPC was conducted to terminate the polymerization reaction at the stage when Mn was 7,000. After the reaction was terminated, the process was also effected in the same manner as in Synthesis Example 1 to obtain the intended hydrophobic polymer unit precursor. The identification of the thus-obtained compound was conducted by means of NMR and GPC. Mn was 7,000, and Mw/Mn was 1.20. The polymerization ratio of A:B was 1:1.

Synthesis Example 5

Synthesis of Block Polymer 4

Amphiphilic Block Polymer Having a Polymerizable Unsaturated Group at One Terminal Synthesis of Polymerization Initiator Species VEMA, which had been purified in advance by vacuum distillation under conditions of 45 to 50° C./0 mmHg, was mixed with 10 molar equivalents of acetic acid, and the mixture was stirred for one day at room temperature. The liquid mixture obtained after the reaction was dissolved in hexane and washed with an aqueous alkaline solution to remove unreacted acetic acid. After hexane was then distilled off from the resultant solution by means of an evaporator, the residue was dried under reduced pressure for at least one day to obtain the intended cationic living polymerization initiator (VEM-OAc). The identification of the compound synthesized was conducted by means of NMR.

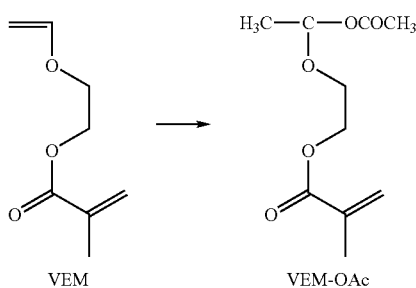

<Synthesis of Block Polymer Having a Polymerizable Unsaturated Group at One Terminal and Composed of 4-methyl-benzeneoxyethyl Vinyl Ether (TolOVE) [block A], Methoxyethoxyethyl Vinyl Ether (MOEOVE) [block B] and t-butyldimethylsilyl 4-{(vinyloxy)ethoxy}benzoate (VEEt-PhCOOTBDMSi) [block C]>

Polymerization was conducted in the same manner as in Synthesis Example 2 except that the composition of the block A was changed to 50 mmol (millimols) of 4-methylbenzeneoxyethyl vinyl ether (TolOVE), and 1-isobutoxyethyl acetate was changed to VEM-OAc synthesized previously. The identification of this block polymer was conducted by means of NMR and GPC. Mn was 30,200, and Mw/Mn was 1.24. The polymerization ratio of A:B:C was 100:100:20.

The thus-obtained block polymer was subjected to a post treatment in the same manner as in Synthesis Example 1 to obtain Block Polymer 4 in which the side chain of the block C is in the form of sodium carboxylate.

Example 1

In 200 parts by mass of dimethylformamide were co-dissolved 10 parts by mass of Block Polymer 1 obtained in Synthesis Example 1, 10 parts by mass of MONARCH 880 (product of Cabot Company), which was carbon black as a coloring material, and 0.005 part by mass of azobisisobutyronitrile (AIBN). This solution was converted into a water phase using 400 parts by mass of distilled water to obtain a composition. After the composition was subjected to an ultrasonic homogenizer for 10 minutes to disperse it, distilled water was added so as to give a solid content concentration of 1%. During this process, the process was carried out while cooling the solution so as to always keep a temperature of 40° C. or lower. Thereafter, a crosslinking reaction was conducted for 48 hours at a temperature of 60° C.

Dimethylformamide was then removed by using a permeable membrane (product of SPECTRUM Laboratories Co., molecular porous membrane tubing (MWCO:3500)) to obtain a composition. Water in this composition was distilled off to adjust it so as to give a solid content concentration of 20%, thereby preparing an aqueous pigment dispersion. This dispersion was used to prepare Ink Composition 1 so as to have the following composition. The composition was as follows: 25 parts by mass of the aqueous pigment dispersion, 8 parts by mass of glycerol, 5 parts by mass of ethylene glycol, 5 parts by mass of ethanol, 0.05 part by mass of EMULGEN 120 (product of Kao Corporation), and 57 parts by mass of water.

After 50 parts by mass of water was added to 5 parts by mass of the aqueous pigment dispersion, and the mixture was uniformly stirred, acid precipitation, which will be described subsequently, was conducted. 1N HCl was gradually added dropwise to the aqueous pigment dispersion diluted above until the pH thereof reached 3, and precipitate formed was filtered and washed with water, thereby obtaining a black wet cake (acid precipitation). To this wet cake, were added 50 parts by weight of heavy water and sodium deuterohydroxide in an amount equivalent to the ionic group in the polymer, and the resultant mixture was subjected to an ultrasonic homogenizer for 30 minutes to re-disperse the precipitate. Thereafter, acid precipitation was conducted again, the resultant wet cake was dispersed likewise by adding heavy water and sodium deuterohydroxide, and heavy water was then added so as to give a solid content concentration of 1%. This aqueous solution was subjected to NMR measurement. As a result, it was confirmed that no peak derived from the hydrophobic segment appeared, and only a peak derived from the hydrophilic segment was observed, and so the hydrophobic segment was located in a core part of each dispersed particle.

Example 2

An ink composition was obtained in the same manner as in Example 1 except that Block Polymer 2 obtained in Synthesis Example 2 was used.

Example 3

An ink composition was obtained in the same manner as in Example 1 except that Block Polymer 3 obtained in Synthesis Example 3 was used.

Example 4

An ink composition was obtained in the same manner as in Example 1 except that 1 part by mass of Polymer 1, which was the hydrophobic polymer unit precursor obtained in Synthesis Example 4, and 10 parts by mass of Block Polymer 4 obtained in Synthesis Example 5 were used, the crosslinking reaction was conducted for 48 hours at a temperature of 80° C.

Example 5

An ink composition was obtained in the same manner as in Example 1 except that Block Polymer 1 obtained in Synthesis Example 1 and 10 parts by mass of C.I. Pigment Blue 15:3 being a cyan pigment as a coloring material were used.

Synthesis Example 6

To an reaction vessel of an automatic polymerization reaction apparatus (polymerization tester DSL-2AS Model, manufactured by Todoroki Sangyo Co., Ltd.) having the reaction vessel equipped with a stirrer, a dropping device, a temperature sensor and a reflux condenser having a nitrogen introducing device at an upper part thereof was charged with 1,400 parts of methyl ethyl ketone, and the interior of the reaction vessel was purged with nitrogen while stirring. While keeping the interior of the reaction vessel under a nitrogen atmosphere, the temperature was raised to 80° C., and a liquid mixture of 106 parts of butyl methacrylate, 312 parts of n-butyl acrylate, 75 parts of 2-hydroxyethyl methacrylate, 307 parts of methacrylic acid, 200 parts of styrene and 140 parts of Perbutyl O (effective component: t-butyl peroxy-2-ethylhexanoate, product of Nippon Oil & Fats Co., Ltd.) was added dropwise from the dropping device over 4 hours. After completion of the drop addition, the reaction was continued at the same temperature additionally for 15 hours to obtain a solution of an anionic-group-containing organic polymer compound (A) having an acid value of 200 and a weight average molecular weight of 48,000.

Synthesis Example 7

The reaction vessel of the automatic polymerization reaction apparatus used in Synthesis Example 6 was charged with 940 parts of methyl ethyl ketone, and the interior of the reaction vessel was purged with nitrogen while stirring. While keeping the interior of the reaction vessel under a nitrogen atmosphere, the temperature was raised to 80° C., and a liquid mixture of 500 parts of butyl acrylate, 200 parts of styrene, 300 parts of 2,3-epoxypropyl methacrylate and a solution with 60 parts of V59 (effective component: 2,2'-azobis-(2-methylbutyronitrile), product of Wako Pure Chemical Industries, Ltd.) dissolved in 150 parts of methyl ethyl ketone was added dropwise from the dropping device over 4 hours. After completion of the drop addition, the reaction was continued at the same temperature additionally for 15 hours to obtain a solution of a glycidyl-group-containing organic polymer compound (B) having a weight average molecular weight of 21,000.

Preparation Example 1

Firstly, the polymer compound (A) obtained in Synthesis Example 6 and the polymer compound (B) obtained in Synthesis Example 9 were blended just before dispersing operation in such an amount that the mass ratio of A:B becomes 9:1 in terms of solid content. The molar equivalent of the glycidyl group in 1,000 g of the mixture before dispersion and crosslinking was about 0.09.

A mixing tank equipped with a cooling jacket was charged with the thus blended polymer compound mixture, a 20% aqueous solution of sodium hydroxide, water and carbon black (#960, product of Mitsubishi Chemical Corporation), and they were stirred and mixed. The charged amounts of the respective components are 1,000 parts of carbon black, the amount of the blended polymer required to give a solid content concentration of 40% by mass in terms of carbon black, the amount of the 20% aqueous solution of sodium hydroxide required to neutralize the acid value of the anionic-group-containing organic polymer compound by 100%, and the amount of water required for the solid content concentration of the liquid mixture so as to be 30%.

The liquid mixture was caused to pass through a dispersing machine (SC Mill Model SC100/32, manufacture by Mitsui Mining Co., Ltd.) filled with zirconia beads having a diameter of 0.3 mm to conduct dispersion for 4 hours by a circulating system. The rotating speed of the dispersing machine was controlled to 2,700 revolutions/min, and cold water was caused to pass through the cooling jacket so as to keep the temperature of the dispersion liquid at 40° C. or lower.

After completion of the dispersion, the mother dispersion liquid was taken out of the mixing tank, the mixing tank and the flow path of the dispersing machine were washed with 10,000 parts of water, and the washings were then put together with the mother dispersion liquid to obtain a diluted dispersion liquid. The diluted dispersion liquid was put into a glass-made distillation apparatus to remove the whole amount of methyl ethyl ketone and a part of water by atmospheric distillation.

The dispersion liquid, from which methyl ethyl ketone had been removed, was cooled, 10% hydrochloric acid was then added dropwise while stirring to adjust its pH to 4.5, and solids were then separated by filtration by a filter and washed with water. The resultant cake was put into a container, to which a 20% aqueous solution of potassium hydroxide in an amount required to neutralize the acid value of the anionic-group-containing polymer compound by 90%, and water were added. Dispersion was conducted again by means of a dispersing and stirring machine (TK Homodisper Model 20, manufactured by Tokushu Kika Kogyo Co., Ltd.), and pure water was added to adjust the solid content concentration to 23%. After this dispersion liquid was subjected to centrifugation to remove coarse particles, pure water was added to adjust the content of non-volatile matter, thereby obtaining an aqueous black pigment dispersion having a solid content concentration of 20%.

Synthesis Example 8

Polymerization was conducted in the following manner using a publicly known group transfer polymerization.

A 1-liter flask was equipped with a mechanical stirrer, a thermometer, an $N_2$ inlet tube, an outlet with a drying pipe and a dropping funnel. The flask was charged with 940 g of tetrahydrofuran (THF) and 0.1 g of mesitylene. Then, 230 μl of a 1.0 M THF solution of tetrabutylammonium m-chlorobenzoate, which was a catalyst, was added, and 1.5 g (0.00862 mol) of 1-methoxy-1-trimethylsiloxy-2-methylpropane, which was an initiator, was poured.

Then, 230 μl of a 1.0 M THF solution of tetrabutylammonium m-chlorobenzoate was added over 130 minutes.

Thereafter, 151.74 g (0.862 mol) of benzyl methacrylate (BZMA) as a block A was added over 60 minutes. After the polymerization was allowed to progress, and 30 minutes elapsed after 99% or more of the monomer was reacted, 212.07 g (0.862 mol) of ethoxytriethylene glycol methacrylate (ETEGMA) as a block B was added over 60 minutes. After the polymerization was allowed to progress, and 1 hour elapsed after 99% or more of the monomer was reacted, 27.24 g (0.172 mol) of trimethylsilylmethacrylic acid (TMS-MAA) as a block C was added over 60 minutes. After the polymerization was allowed to progress, and 99% or more of the monomer was reacted, a part of the solution was taken out to analyze an aliquot of the solution by $^1$H NMR, thereby confirming the fact that no residual monomer was present. Thereafter, 50 ml of methanol was added, and refluxing was conducted for 16 hours to remove a trimethylsilyl protecting group from methacrylic acid.

Thereafter, a polymer was isolated by a reprecipitation process with hexane and dried by means of a vacuum dryer. As a result of NMR analysis, it was confirmed that the trimethylsilyl protecting group was completely removed.

The identification of this block polymer was conducted by means of NMR and GPC. Mn was 43,800, and Mw/Mn was 1.18. The polymerization ratio of A:B:C was 100:100:20.

The block polymer was further neutralized with an equiamount of 1N sodium hydroxide, and water was distilled off to obtain Block Polymer 5 in which the side chain of the block C is in the form of sodium carboxylate.

Synthesis Example 9

A solution of 2.16 g (2.46 mL, 0.00862 mol) of 1-(2-dimethylaminoethoxy)-1-trimethylsiloxy-2-methyl-1-propene, 0.5 mL of tetrabutylammonium biacetate hexahydrate (0.04 M in THF) and 0.8 g (1.0 mL, 6 millimols) of bis (dimethyl-amino)methylsilane in 900 mL of THF was left to stand for 10 minutes. A mixture of 75.87 g (0.431 mol) of benzyl methacrylate (BZMA) and 0.4 g (0.5 mL, 3 millimols) of bis(dimethylamino)methylsilane was slowly added as a block A from a dropping funnel. After the polymerization was allowed to progress, and 30 minutes elapsed after 99% or more of the monomers were reacted, a mixture of 212.07 g (0.862 mol) of ethoxytriethylene glycol methacrylate (ETEGMA) and 0.4 g (0.5 mL, 3 millimols) of bis(dimethylamino)methylsilane was added as a block B over 60 minutes. After the polymerization was allowed to progress, and 1 hour elapsed after at least 99% of the monomers were reacted, a mixture of 27.24 g (0.172 mol) of trimethylsilylmethacrylic acid (TMS-MAA) and 0.4 g (0.5 mL, 3 millimols) of bis (dimethylamino)methylsilane was added as a block C over 60 minutes. After the polymerization was allowed to progress, and 99% or more of the monomers were reacted, a sample of the resultant solution was analyzed by $^1$H NMR. As a result, it was confirmed that no residual monomer was present. Thereafter, a polymer was isolated by a reprecipitation process with hexane and dried by means of a vacuum dryer, thereby obtaining a precursor of Block Polymer 6. A half of the precursor of Block Polymer 6 was taken out and dissolved again in THF, and an excess amount of methacrylic chloride was added, followed by overnight stirring. Thereafter, a polymer was isolated by a reprecipitation process with hexane and dried by means of a vacuum dryer.

In order to deprotect a trimethylsilyl protecting group, 1 g of the block polymer thus obtained was dissolved in 45 ml of THF, 5 ml of a 3N HCl/ethanol solution was added, the resultant mixture was stirred for 3 hours at room temperature (23° C.), and 20 ml of ethanol was then added to stir the mixture additionally for 3 hours. The reaction was monitored by means of NMR, and the reaction mixture was neutralized with sodium carbonate after hydrolysis was completed by 100% to end the reaction. After the reaction mixture was filtered, the resultant filtrate was concentrated by means of an evaporator and extracted with methylene chloride, the resultant extract was dried, and the solvent was then distilled off to obtain a block polymer in which a side chain of the block C is in the form of a free carboxylic acid polymer. It was also confirmed by NMR that almost all the double bonds in the terminal vinyl group are left.

The block polymer was neutralized with an equiamount of 1N sodium hydroxide, and water was distilled off to obtain Block Polymer 7 in which the side chain of the block C is in the form of sodium carboxylate, and a double bond is present at a terminal.

In the above-described experimental process, the concentration by the evaporator and distilling-off of water were conducted at a low temperature of 40° C. or lower for the purpose of inhibiting a reaction of the unsaturated bond in the terminal vinyl group.

The identification of this block polymer was conducted by means of NMR and GPC. Mn was 36,700, and Mw/Mn was 1.20. The polymerization ratio of A:B:C was 50:100:20.

On the precursor of Block Polymer 6, the above-described neutralization process and drying were conducted to obtain Block Polymer 6 in which the side chain of the block C is in the form of sodium carboxylate.

The identification of this block polymer was conducted by means of NMR and GPC. Mn was 36,700, and Mw/Mn was 1.20. The polymerization ratio of A:B:C was 50:100:20.

Comparative Example 1

An ink composition was prepared from the aqueous black pigment dispersion obtained in Preparation Example 1 using the technique in Example 1. The composition of the ink was as follows: 25 parts by mass of the aqueous pigment dispersion, 8 parts by mass of glycerol, 5 parts by mass of ethylene glycol, 5 parts by mass of ethanol, 0.05 part by mass of EMULGEN 120 (product of Kao Corporation), and 57 parts by mass of water.

Comparative Example 2

In 200 parts by mass of dimethylformamide were co-dissolved 10 parts by mass of Block Polymer 5 obtained in Synthesis Example 8, and 10 parts by mass of MONARCH 800 (product of Cabot Company) being carbon black as a coloring material. This solution was converted into a water phase using 400 parts by mass of distilled water to obtain a composition. After the composition was subjected to an ultrasonic homogenizer for 10 minutes to disperse it, distilled water was added so as to give a solid content concentration of 1%.

Dimethylformamide was then removed by using a permeable membrane (product of SPECTRUM Laboratories Co., molecular porous membrane tubing (MWCO:3500)) to obtain a composition. Water in this composition was distilled off to adjust it so as to give a solid content concentration of 20%, thereby preparing an aqueous pigment dispersion. This dispersion was used to prepare Ink Composition 1 so as to have the following composition. The composition was as follows: 25 parts by mass of the aqueous pigment dispersion, 8 parts by mass of glycerol, 5 parts by mass of ethylene glycol, 5 parts by mass of ethanol, 0.05 part by mass of EMULGEN 120 (product of Kao Corporation), and 57 parts by mass of water.

Comparative Example 3

An ink composition was prepared in the same manner as in Comparative Example 2 except that 1 part by mass of Polymer 1, which was the hydrophobic polymer unit precursor obtained in Synthesis Example 4, and 10 parts by mass of Block Polymer 6 obtained in Synthesis Example 9 were used.

Example 6

An ink composition was prepared in the same manner as in Example 1 except that 1 part by mass of Polymer 1, which was the hydrophobic polymer unit precursor obtained in Synthesis Example 4, and 10 parts by mass of Block Polymer 7 obtained in Synthesis Example 9 were used, and the crosslinking reaction was conducted at a temperature of 80° C. for 48 hours.

Evaluation:

The ink compositions obtained in Examples 1 to 6 and Comparative Examples 1 to 3 were evaluated in the following manner.

(1) Evaluation as to Filterability

In order to confirm the fact that a crosslinking reaction is not carried out between micelles, evaluation as to filterability was made in the following manner. Namely, 20 mL of each ink composition was filtered under pressure using a membrane filter (AP20, product of MILLIPORE Co.). Thereafter, filtration was conducted 3 times with pure water to wash the filter. Whether coarse particles were left on the filter after the filtration or not was visually observed. When the coarse particles are left, a color change takes place due to clogging of the filter caused by the coloring material. When no color change takes place, it can thus be confirmed that coarse particles due to crosslinking between micelles are at least not formed.

Incidentally, the color change of the filter takes place also when coarse particles are formed by aggregation.

The result of the evaluation is shown in Table 1 as 'o' where no color change was observed, or "x" where a color change was observed.

As apparent from Table 1, no color change of the filter was observed on the ink compositions of Examples 1 to 6 and Comparative Example 2, and coarse particles could not be seen.

On the other hand, the color change was observed on the filters through which the ink compositions of Comparative Examples 1 and 3 had been filtered. Since the polymer, in which no crosslinking reaction takes place, is used in Comparative Example 3, it is considered that the coarse particles were formed by aggregation.

(2) Evaluation as to Reactivity of Compound

With respect to the filtrates of the ink compositions of Examples 1 to 6 and Comparative Examples 1 to 3, evaluation as to the reactivity of each compound was made by performing identification of the double bond group using NMR.

The result of the evaluation is shown in Table 1 as "Not found" where no peak corresponding to a double bond was seen, or "Found" where a peak corresponding to a double bond was seen.

No peak corresponding to a double bond was seen in all of Examples 1 to 6 and Comparative Examples 1 and 2.

position was transferred to a Teflon container and stored for 2 months under an environment of 60° C. Thereafter, a precipitated state was visually checked.

The result of the evaluation is shown in Table 1 as 'o' where no precipitation was seen, or 'x' where precipitation was seen.

No precipitation was seen in all of Examples 1 to 6, and so it was confirmed that a crosslinking reaction is allowed to sufficiently progress to immobilize the dispersing resin.

(4) Observation Through Electron Microscope

In order to confirm a micellar state, each of the filtrates after the evaluation as to the filterability was stored for 2 months in an environment of 60° C., frozen and then observed through an electron microscope, Cryo TEM (manufactured by FEI Co.). As a result, substantially spherical structured materials were observed in almost all the observed region as to the ink composition of Examples 1 to 7.

From this result, it is considered that the coloring material in each of Examples of the present application is completely included in the block polymer to form spherical polymer microspheres free of intermicellar crosslinking.

On the other hand, in the ink composition of Comparative Example 2, a great number of particles which were far greater than the substantially spherical structured materials observed in Examples 1 to 6 and were uneven in particle size like those aggregated were observed.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 |
| --- | --- | --- | --- | --- | --- | --- | --- | --- | --- |
| Evaluation as to filterability | o | o | o | o | o | o | x | o | x |
| Evaluation as to reactivity of compound | Not found | Not found | Not found | Not found | Not found | Not found | Not found | Not found | Found |
| Evaluation as to stability to solvent | o | o | o | o | o | o | x | x | x |
| Observation through electron microscope | o | o | o | o | o | o | — | Δ | — |
| Overall evaluation | o | o | o | o | o | o | x | x | x |

From this fact, it is considered that all the crosslinkable substituents in Examples 1 to 6 and Comparative Example 1 underwent a polymerization reaction.

On the other hand, a peak corresponding to a double bond was seen in Comparative Example 3, and so it was confirmed that the crosslinkable substituent underwent no polymerization reaction.

Incidentally, it is considered that no peak corresponding to a double bond was seen in the ink composition of Comparative Example 2 because it has no crosslinkable substituent from the first.

(3) Evaluation as to Stability to Solvent

In order to confirm whether the crosslinking reaction is allowed to sufficiently progress to immobilize the dispersing resin, or not, a test on the stability to a solvent was performed on the respective ink compositions before the filtration in the following manner. Namely, 250 parts by mass of THF was added to 25 parts by mass of each of the ink compositions, the resultant mixture was subjected to an ultrasonic homogenizer for 10 minutes to disperse it, THF was removed by using a permeable membrane (product of SPECTRUM Laboratories Co., molecular porous membrane tubing (MWCO:3500)), and water was then distilled off to adjust the solid content concentration again so as to become 20%. Using this aqueous dispersion was used a solvent and the like were added again thereto to prepare an ink composition, and then the ink com- As shown in Table 1, in the ink compositions of Examples according to the present invention, a crosslinking reaction takes place selectively only within the micelle, and so it is understood that ink compositions superior to conventional ones are provided.

(4) Evaluation as to Printing

Each of the ink compositions prepared in Examples 1 to 6 was charged into an ink-jet printer, BJF 800 (trade name, manufactured by Canon Inc.) to conduct ink jet recording of a solid printed image on the whole surface of glossy paper, Professional Photo Paper PR-101 (trade name; product of Canon Inc.). All the solid printed images were images free of color unevenness and blurring.

With respect to the above-described respective prints, the glossiness was measured by means of "GP-200" (manufactured by Murakami Shikisai Gijutsu Kenkyusho K.K.) under conditions of 12 V, 50 W, an incident beam stop of 1 mmφ, a reflected beam stop of 1.5 mmφ, an ND10 filter, an incident angle of 45°, a swing angle of 0°, and a standard specular plate of 42.5. With respect to the evaluated colors, the average value of the maximum values of the glossiness was found to define it as an average glossiness. As a result of the evaluation, the value of the average glossiness was not lower than 50 in all the prints.

With respect to the print obtained by printing with the cyan ink composition of Example 5, whether the bronzing phenomenon occurred or not was confirmed. As a result, it was confirmed that the image was good without causing bronzing phenomenon.

As described above, it was found that the prints obtained by using the ink compositions according to Examples of the present invention develop excellent effects.

The ink compositions according to the present invention are improved in dispersibility owing to the dispersed particles in which the coloring material is included by the crosslinked hydrophobic block segment in the dispersing polymer, and are hence excellent in dispersion stability and re-solubility, so that they can be utilized as various kinds of ink-jet inks.

This application claims the benefit of Japanese Patent Application Nos. 2005-109172 filed on Apr. 5, 2005, and 2006-102283 filed on Apr. 3, 2006, which are hereby incorporated by reference herein in their entirety.

The invention claimed is:

1. A composition comprising:
a block polymer compound including a hydrophobic block segment and a hydrophilic block segment;
a hydrophobic substance; and
an aqueous medium,
wherein a micelle is formed by adsorption of the hydrophobic block segment on the hydrophobic substance in the aqueous medium,
wherein the hydrophobic block segment comprises (a) a repeating structural unit of the following General Formula (A) which includes a self-crosslinkable functional group and (b) a repeating structural unit of the following General Formula (1) or General Formula (2):

General Formula (A)

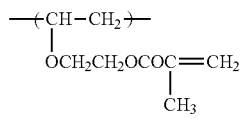

General Formula (1)

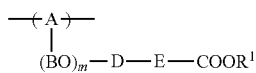

wherein in General Formula (1), A denotes a polyalkenyl ether group, which may be substituted; B denotes a linear or branched alkylene group having 1 to 15 carbon atoms, which may be substituted; m is an integer of from 0 to 30, wherein when m is a plural number, the B groups may be different from each other; D denotes a single bond or a linear or branched alkylene group having 1 to 10 carbon atoms, which may be substituted; E denotes an aromatic ring, which may be substituted, a fused ring, which may be substituted, a structure in which at most 3 aromatic rings, which may be substituted, are bonded via a single bond, or a methylene group; and $R^1$ denotes a linear or branched alkyl group having 1 to 5 carbon atoms, which may be substituted, or an aromatic ring, which may be substituted, General Formula (2)

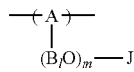

wherein in General Formula (2), A denotes a polyalkenyl ether group, which may be substituted; $B_1$ denotes a linear or branched alkylene group having 1 to 15 carbon atoms, which may be substituted; m is an integer of from 0 to 30, wherein when m is a plural number, the $B_1$ groups may be different from each other; and J denotes a linear or branched alkyl group having 3 to 15 carbon atoms, which may be substituted, an aromatic ring, which may be substituted, a fused ring, which may be substituted, or a structure in which at most 3 aromatic rings, which may be substituted, are bonded via a single bond.

2. The composition according to claim 1, wherein the number of repeating units in the hydrophobic block segment in the block polymer compound is fewer than the number of repeating units in the hydrophilic block segment.

3. The composition according to claim 1, wherein the main chain structure of each of the block segments is a polyalkenyl ether structure.

4. The composition according to claim 1, wherein in General Formula (1), m is an integer of from 1 to 10.

5. The composition according to claim 1, wherein in General Formula (2), m is an integer of from 1 to 10.

6. The composition according to claim 1, wherein the hydrophobic substance is a coloring material.

7. The composition according to claim 6, wherein the coloring material is a pigment.

8. The composition according to claim 1, wherein the hydrophilic block segment comprises an ionic hydrophilic block segment and a nonionic hydrophilic block segment.

9. The composition according to claim 8, wherein the block polymer compound comprises the hydrophobic block segment, the nonionic hydrophilic block segment and the ionic hydrophilic block segment, which are bonded in this order.

10. The composition according to claim 1, wherein the hydrophobic block segment comprises a block segment containing a crosslinkable substituent and a block segment containing no crosslinkable substituent.

11. The composition according to claim 10, wherein the block segment containing the crosslinkable substituent is arranged at a position other than the endmost position of the block polymer compound.

12. The composition according to claim 1, wherein the composition is an ink composition.

13. The ink composition according to claim 12, wherein the ink composition is an ink jet composition.

14. The composition according to claim 1, wherein the hydrophilic block segment comprises a repeating structural unit of the following General Formula (3) or General Formula (4):

General Formula (3)

wherein in General Formula (3), A denotes a polyalkenyl ether group, which may be substituted; B' denotes a linear or branched alkylene group having 1 to 5 carbon atoms, which may be substituted; m is an integer of from 0 to 30, wherein when m is a plural number, the B' groups may be different from each other; D' denotes a single bond or a linear or branched alkylene group having 1 to 5 carbon atoms, which may be substituted; and K denotes a linear or branched alkyl group having 1 to 3 carbon atoms, which may be substituted, or a hydroxyl group,

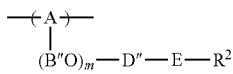
General Formula (4)

wherein in General Formula (4), A denotes a polyalkenyl ether group, which may be substituted; B" denotes a linear or branched alkylene group having 1 to 15 carbon atoms, which may be substituted; m is an integer of from 0 to 30 and, when m is a plural number, the B" groups may be different from each other; D" denotes a single bond or a linear or branched alkylene group having 1 to 10 carbon atoms, which may be substituted; E" denotes an aromatic ring, which may be substituted, a fused ring, which may be substituted, a structure in which at most 3 aromatic rings, which may be substituted, are bonded via a single bond, or a methylene group; and $R^2$ denotes a structure of —$COO^-M$ where M denotes a monovalent or polyvalent metal cation.

15. The composition according to claim 14, wherein in General Formula (3), m is an integer of from 1 to 10.

16. The composition according to claim 14, wherein in General Formula (4), m is an integer of from 1 to 10.

17. The composition according to claim 14, wherein the hydrophilic block segment comprises a repeating structural unit of General Formula (3) and a repeating structural unit of General Formula (4).

18. An image forming process comprising the step of applying the composition according to claim 6 to a medium, thereby recording an image.

19. An image forming apparatus comprising a means for applying the composition according to claim 6 to a medium, thereby recording an image.

* * * * *